United States Patent Office 2,919,271
Patented Dec. 29, 1959

2,919,271

3-AMINO-1,2-DIHYDRO-3H-PYRIDO [3,2,1-KL]-PHENOTHIAZINES

Paul N. Craig, Roslyn, and John J. Lafferty, Levittown, Pa., assignors to Smith, Kline & French Laboratories, Philadelphia, Pa., a corporation of Pennsylvania No Drawing. Application December 5, 1957
Serial No. 700,757

8 Claims. (Cl. 260—243)

This invention relates to new 3-amino-1,2-dihydro-3H-pyrido[3,2,1-kl]phenothiazines which have useful pharmacological activity.

More specifically the compounds of this invention have unusual central nervous system activity. Their artaractic and sedative activity is particularly novel. Also, they variously have mild stimulant and biphasic depressant activity. In addition, the 1,2-dihydro-3H-pyrido[3,2,1-kl]phenothiazine compounds possess chemotherapeutic activity such as antifungal and antibacterial activity.

The novel 3-amino-1,2-dihydro-3H-pyrido[3,2,1-kl]-phenothiazines of this invention are represented by the following structural formula:

Formula 1

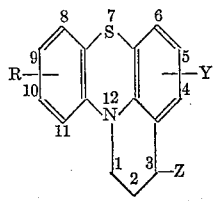

when:

R represents hydrogen, chlorine, bromine, fluorine or trifluoromethyl, preferably in the 10-position, Y represents hydrogen, lower alkoxy advantageously methoxy, lower alkyl advantageously methyl, preferably in the 4-position; and Z represents amino, lower alkylamino, di(lower alkyl) amino, pyrrolidinyl, piperidinyl, (N-lower alkyl)piperazinyl, morpholinyl or thiomorpholinyl.

Advantageous compounds of this invention are represented by the following structural formula:

Formula 2

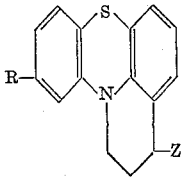

when:

R represents chlorine, bromine, fluorine or trifluoromethyl; and

Z represents amino, di(lower alkyl) amino, pyrrolidinyl or (N-lower alkyl)piperazinyl.

By the term "lower alkyl" where used herein alone or in combination with other terms, alkyl groups having not more than 6 carbon atoms, preferably not more than 4, are indicated.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bis-methylenesalicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic and theophyllineacetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of this invention are prepared from substituted 2,3-dihydro-3-keto-1H-pyrido[3,2,1-kl]phenothiazines which are in turn prepared by cyclizing the corresponding 10 - (2' - carboxyethyl) - phenothiazines. Starting with the substituted phenothiazine nucleus, the following synthetic route shows the preparation of the 2,3-dihydro-3-keto-1H-pyrido[3,2,1-kl]phenothiazine intermediates.

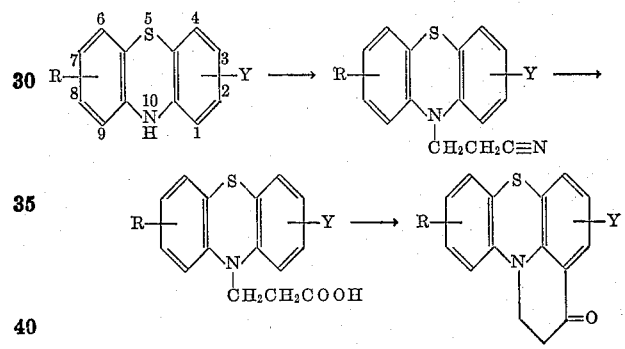

The terms R and Y are as previously defined.

The phenothiazine starting material unsubstituted in the 10-position is converted to the 10-(2'-cyanoethyl)-phenothiazine by reacting the 10-unsubstituted phenothiazine either with a large excess of acrylonitrile or with about a molar equivalent of acrylonitrile in an inert solvent such as benzene or ether, preferably in the presence of a catalytic amount of strong base, such as a quaternary base, for instance, benzyltrimethylammonium hydroxide. The resulting 10-(2'-cyanoethyl)-phenothiazine is hydrolyzed to the corresponding 10-(2'-carboalkoxyethyl)-analogue by reacting a solution of the cyano compound in an inert solvent such as dioxane with a suitable acid, for instance, hydrogen chloride in methanol. Addition of water and subsequent hydrolysis of the 10-(2'-carboalkoxyethyl)-phenothiazine by refluxing in a lower alcohol such as methanol or ethanol with an alkali metal hydroxide, for example, potassium hydroxide or sodium hydroxide followed by acidification produces the desired 10-(2'-carboxyethyl)-phenothiazine.

Alternatively, the 10-(2'-cyanoethyl)-phenothiazine is hydrolyzed with aqueous alcoholic alkali metal hydroxide solution followed by subsequent acidification.

The 10-(2'-carboxyethyl)-phenothiazine is cyclized by refluxing with a dehydrating agent such as phosphorus pentoxide or, preferably, trifluoroacetic anhydride in an inert non-polar solvent which is not hydroxylated such as ether, toluene or benzene to form 2,3-dihydro-3-keto-1H-pyrido [3,2,1-kl]-phenothiazine.

The 3-amino-1,2-dihydro - 3H - pyrido[3,2,1-kl]phenothiazine compounds of this invention are prepared according to the following synthetic route:

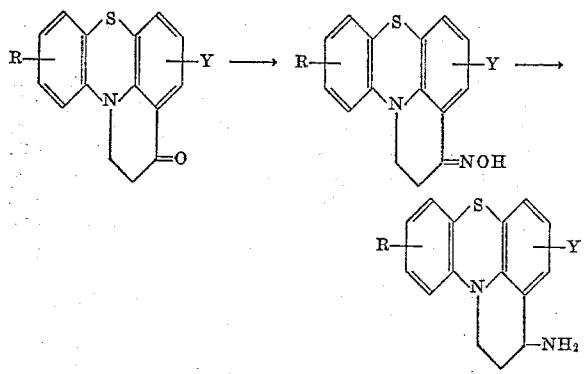

when: R and Y are as previously described.

The oxime derivative of the cyclic ketone is prepared preferably by reacting the ketone with hydroxylamine hydrochloride in a suitable tertiary organic base such as pyridine or collidine for short periods of time, for instance, from about one to six hours at reflux temperature.

Reduction of the oxime to the 3-amino-1,2-dihydro-3H-pyrido[3,2,1-kl]phenothiazine is accomplished either by chemical reduction or catalytic hydrogenation. With respect to the preferred chemical reduction the oxime in an organic solvent preferably a lower alcohol such as ethanol or methanol is reacted with the reducing agent, for example, sodium amalgam and glacial acetic acid at room temperature for a short period of time, for instance, from 30 to 90 min. The 3-amino-1,2-dihydro-3H-pyrido-[3,2,1-kl]phenothiazine is conveniently separated from the reaction mixture in the form of its hydrochloride salt. Other reducing agents such as zinc or stannous chloride in hydrochloric acid may be used.

Where catalytic hydrogenation is employed, the oxime in an organic solvent, for example, a lower alcohol, such as ethanol or methanol is reduced using a catalyst, for example, platinum oxide, at about 75–125° C. and about 400–600 p.s.i. for several days. Other catalysts which may be used are, for example, Raney nickel or palladium-on-charcoal.

The thus formed 3-amino-1,2-dihydro-3H-pyrido[3,2,1-kl]phenothiazines are alkylated by reaction with a reactive alkyl ester or by reductive alkylation to form the 3-substituted amino compounds of Formula 1. For the alkylation, any reactive alkyl ester containing the desired moiety may be used, such as the preferred halides, for example iodide, bromide or chloride. The condensation is carried out advantageously by refluxing the reactants in an inert aromatic solvent such as, preferably benzene, toluene or xylene, in which at least one of the reactants must be soluble. A suitable acid-binding agent is usually included, such as an alkali metal cabonate, bicarbonate, hydroxide, amide or hydride, preferably the sodium or potassium compounds.

Advantageously, the heterocyclic amine derivatives are prepared by carrying out the reaction on the primary amine with a reactive difunctional alkyl ester such as, for example, by reacting the primary amine with 1,4-dibromobutane to form the pyrrolidinyl compound.

Alternatively, the 3-amino-1,2-dihydro-3H-pyrido-[3,2,1-kl]phenothiazines are reacted with a suitable keto or aldehydo compound under reductive conditions such as with formaldehyde-formic acid or in a hydrogen atmosphere with a catalyst such as Raney nickel, palladinized charcoal or platinum oxide.

Advantageously, 3 - dimethylamino - 1,2 - dihydro-3H-pyrido[3,2,1-kl]phenothiazines may be prepared by this method, i.e. reductive alkylation. An aqueous solution of the primary amine or preferably a mineral acid salt such as the hydrochloride is made alkaline with a basic solution such as 10% sodium hydroxide, then acid with formic acid solution. The mixture is refluxed with aqueous formaldehyde such as a 37% solution for about two hours, filtered, made alkaline and extracted with benzene. Concentration of the benzene solution gives the 1,2-dihydro-3-dimethylamino-3H-pyrido[3,2,1-kl]phenothiazine.

It will be apparent to one skilled in the art that the novel compounds of this invention may exist in various isomeric forms since they possess a ring carbon atom asymmetrically substituted. The scope of this invention includes the separated isomers as well as mixtures thereof. The preferred compounds of this invention are the mixtures of isomers produced as described hereafter.

The following examples are not limiting but are illustrative of compounds of this invention and the procedures for their preparation and will serve to make fully apparent all of the compounds embraced by the general formula given above and the preparation thereof respectively.

*Example 1*

A solution of 16.0 g. of 10-(2'-cyanoethyl)-2-tri-fluoromethylphenothiazine in 250 ml. of dry dioxane is mixed with a solution of 31.0 g. of hydrogen chloride in 150 ml. of dry methanol. After standing at room temperature for 24 hours, 6 ml. of water is added. About half of the solvent is removed in vacuo. A precipitate of ammonium chloride is separated by filtration. The volatiles are completely removed in vacuo and the gummy residue vacuum distilled to give 10-(2'-carbomethoxyethyl)-2-trifluoromethylphenothiazine, B.P. 172 to 175° C. at 55 microns.

A solution of 1.0 g. of this ester in 100 ml. of methanol containing one equivalent of potassium hydroxide with 10 ml. of water is heated at reflux for two hours. The solution is concentrated to give a residue which is washed with water and acid, then taken up in benzene. The benzene solution is extracted with dilute sodium hydroxide. The extracts are neutralized to yield crystals of 10-(2'-carboxyethyl)-2-trifluoromethylphenothiazine, M.P. 180–181° C.

A solution of 7.5 g. of this acid in 300 ml. of dry benzene with 40 ml. of trifluoroacetic anhydride is heated at reflux for three hours. The solution is evaporated after washing with dilute sodium hydroxide to give crystals of the cyclic ketone, M.P. 158–159° C.

A solution of 2.5 g. of the ketone and 1.38 g. of hydroxylamine hydrochloride in 80 ml. of pyridine is heated at reflux for two hours. After evaporation of the volatiles, the residue is taken up in benzene. Concentration and cooling gives yellow crystals of the desired oxime, M.P. 202–203° C.

A solution of 1.6 g. of the oxime in 70 ml. of ethanol is stirred while 23.7 g. of sodium amalgam and 1.5 ml. of glacial acetic acid are added portionwise. After the reaction mixture is stirred for about one hour, a mixture of 150 ml. of water and 100 ml. of ether is added. The resulting reaction mixture is treated with dilute hydrochloric acid to form the hydrochloride salt of 3-amino-1,2-dihydro-10-trifluoromethyl-3H-pyrido[3,2,1-kl]phenothiazine as crystals from ethanol-ether, M.P. 254–255° C.

*Example 2*

A slurry of 12.1 g. of the primary amine from Example 1 in 500 ml. of water is made alkaline with 10% sodium hydroxide solution, then acid with formic acid solution. Aqueous 37% formaldehyde (60 ml.) is added and the resulting mixture heated on the steam bath for two hours. The filtered mixture is made alkaline with 10% sodium hydroxide. Extraction with benzene gives an oily residue upon concentration; 1,2-dihydro-3-dimethylamino-10-trifluoromethyl-3H-pyrido[3,2,1-kl]phenothiazine.

This oil is dissolved in ether and treated with alcoholic hydrogen chloride to separate the crystalline hydrochloride, M.P. 239–240° C.

Example 3

A solution of 0.2 g. of 10-(2'-carboxyethyl)-2-chlorophenothiazine in 5 ml. of benzene and 2.0 g. of trifluoroacetic anhydride is heated at reflux for 15 minutes. The volatiles are allowed to evaporate and the product isolated as in Example 1 to give the 10-chloro-2,3-dihydro-3-keto-1H-pyrido[3,2,1-kl]phenothiazine as long needles, M.P. 183–185° C.

This ketone (500 mg.) is reacted with hydroxylamine hydrochloride and sodium amalgam as in Example 1 to give 3-amino-10-chloro-1,2-dihydro-3H-pyrido[3,2,1-kl]-phenothiazine as long needles from ethanol-ether.

Example 4

A solution of 2.86 g. of 10-(2'-carboxyethyl)-phenothiazine in 75 ml. of benzene with 2.1 g. of trifluoroacetic anhydride is heated for a few minutes and poured into an excess of water. After separation of the organic layer, the desired cyclic ketone (2,3-dihydro-3-keto-1H-pyrido[3,2,1-kl]phenothiazine) is recovered by drying, washing and evaporating the benzene layer, M.P. 102–104° C.

A solution of 5.15 g. of the ketone is reacted with 2.82 g. of hydroxylamine hydrochloride in 100 ml. of pyridine and 20 ml. of ethanol. The reaction is worked up as in Example 1 to give the corresponding oxime as crystals, M.P. 222–224° C.

A slurry of 11.0 g. of oxime in 50 ml. of ethanol is hydrogenated with platinum oxide (0.4 g.) at 95–100° C. and about 500 p.s.i. for six days. The mixture is filtered to give the crude product which is extracted successively with acetic acid and ethanol. The combined filtrates are concentrated and diluted with water. The resulting solid is then dissolved in ethanol and treated with hydrogen chloride gas to give crystals of 3-amino-1,2-dihydro-3H-pyrido[3,2,1-kl]phenothiazine hydrochloride, M.P. 243–248° C.

Example 5

A slurry of 6.5 g. of the hydrochloride of Example 4 in 100 ml. of water is made alkaline with 10% sodium hydroxide, then formic acid is added until a clear solution results. An excess of formalin is added. After heating on the steam bath for two hours, the reaction mixture is extracted with benzene. The extracts are evaporated and the residue taken up in ethyl acetate. An excess of maleic acid solution is added to separate the maleate salt of 1,2-dihydro-3-dimethylamino-3H-pyrido[3,2,1-kl]phenothiazine, M.P. 198–199° C.

Example 6

A mixture of 17.4 g. of 3-amino-1,2-dihydro-10-trifluoromethyl-3H-pyrido[3,2,1-kl]phenothiazine hydrochloride (prepared as in Example 1) in 500 ml. of water is made alkaline with 10% sodium hydroxide solution. The free amine is extracted with benzene.

The benzene extracts together with 6.8 g. of n-butyl bromide and 5.0 g. sodium carbonate are heated at reflux for ten hours. The cooled reaction mixture is treated with water and the organic layer is separated. Upon evaporation of the solvent in vacuo, the crude product, 3-n-butylamino-1,2-dihydro-10-trifluoromethyl-3H-pyrido[3,2,1-kl]phenothiazine, is obtained. The product is purified by molecular distillation at 180° C. and 10 microns.

Example 7

A mixture of 14.4 g. of the 3-amino-10-chloro-1,2-dihydro-3H-pyrido[3,2,1-kl]phenothiazine, prepared as in Example 3, 7.5 g. of n-hexyl bromide and 4.0 g. of potassium carbonate in 300 ml. of benzene is heated at reflux for 12 hours. The cooled reaction mixture is poured into water and the organic layer is separated. Upon removal of the dried solvent in vacuo the crude product, 10-chloro-1,2-dihydro-3-n-hexylamino-3H-pyrido[3,2,1-kl]phenothiazine, is obtained.

Example 8

A mixture of 14.4 g. of 3-amino-10-chloro-1,2-dihydro-3H-pyrido[3,2,1-kl]phenothiazine, prepared as in Example 3, in formic acid solution with 5.0 g. of aqueous 37% formaldehyde is heated on the steam bath for three hours. The filtered mixture is made alkaline with 10% potassium hydroxide. Extraction with benzene and evaporation of the solvent in vacuo yields the product, 10-chloro-1,2-dihydro-3-dimethylamino-3H-pyrido[3,2,1-kl]phenothiazine.

The product (1.0 g.) is dissolved in 250 ml. of ether and treated with an excess of alcoholic hydrogen bromide to separate the crystalline monohydrobromide.

Example 9

A mixture of 17.4 g. of 3-amino-1,2-dihydro-10-trifluoromethyl-3H-pyrido[3,2,1-kl]phenothiazine hydrochloride (prepared as in Example 1) in 500 ml. of water is made alkaline with 10% sodium hydroxide solution. The free amine is extracted with benzene. The benzene extracts together with 10.8 g. 1,4-dibromobutane and 10.0 g. sodium carbonate are heated at reflux for ten hours. The cooled reaction mixture is poured into water and the benzene layer separated. Upon evaporation of the solvent in vacuo the product 1,2-dihydro-3-(1'-pyrrolidinyl)-10-trifluoromethyl-3H-pyrido[3,2,1-kl]phenothiazine, is obtained.

The product (1.0 g.) is dissolved in 250 ml. of ether and treated with an excess of alcoholic hydrogen chloride to separate the crystalline monohydrochloride.

Example 10

A mixture of 16.1 g. of 3-amino-1,2-dihydro-10-trifluoromethyl-3H-pyrido[3,2,1-kl]phenothiazine hydrochloride (prepared as in Example 1) in 300 ml. of water is made alkaline with 10% potassium hydroxide solution. The free amine is extracted with xylene.

The xylene extracts together with 11.5 g. of 1,5-dibromopentane and 14.0 g. of potassium carbonate are heated at reflux for 14 hours. The cooled reaction mixture is treated with water and the xylene layer is separated. Evaporation of the solvent in vacuo yields the crude product, 1,2-dihydro-3-(1'-piperidinyl)-10-trifluoromethyl-3H-pyrido[3,2,1-kl]phenothiazine which is purified by molecular distillation at 200° C. and 10 microns.

A solution of the free base (500 mg.) in 100 ml. of ether is reacted with an excess of glacial acetic acid to yield the monoacetate salt.

Example 11

A mixture of 16.1 g. of 3-amino-1,2-dihydro-10-trifluoromethyl-3H-pyrido[3,2,1-kl]phenothiazine hydrochloride (prepared as in Example 1) in 300 ml. of water is made alkaline with 10% sodium hydroxide solution. The free amine is extracted with toluene.

The toluene extracts together with 7.8 g. of methyl bis(β-chloroethyl)amine and 25.0 g. of tributylamine are heated at reflux for ten hours. The reaction mixture is cooled, then poured into water. The organic layer is separated. Evaporation of the solvent in vacuo yields the crude product 1,2-dihydro-3-(4'-methyl-1'-piperazinyl)-10-trifluoromethyl-3H-pyrido[3,2,1-kl]phenothiazine.

A solution of this product (1.0 g.) in 100 ml. of ethanol is treated with hydrogen chloride gas to give crystals of the dihydrochloride salt.

Example 12

A mixture of 16.1 g. of 3-amino-1,2-dihydro-10-trifluoromethyl-3H-pyrido [3,2,1-kl] phenothiazine hydrochloride (prepared as in Example 1) in 400 ml. of water is made alkaline with 10% sodium hydroxide solution. The free amine is extracted with xylene.

The xylene extracts together with 7.1 g. of bis(β-chloroethyl)ether and 14.0 g. of potassium carbonate are heated at reflux for 12 hours. The cooled reaction mixture is poured into water and the xylene layer is separated. Evaporation of the solvent in vacuo yields the crude product, 1,2-dihydro-3-(4'-morpholinyl)-10-trifluoromethyl-3H-pyrido[3,2,1-kl]phenothiazine.

*Example 13*

A mixture of 14.4 g. of 3-amino-10-chloro-1,2-dihydro-3H-pyrido[3,2,1-kl]phenothiazine (prepared as in Example 3) 7.9 g. of bis(β-chloroethyl)sulfide and 10.0 g. of sodium carbonate is heated at reflux for ten hours. The cooled reaction mixture is poured into water and the organic layer is separated. Upon evaporation of the solvent in vacuo, the crude product, 10-chloro-1,2-dihydro - 3 - (4' - thiomorpholinyl) - 3H - pyrido[3,2,1-kl]phenothiazine, is obtained.

*Example 14*

A solution of 10.8 g. of 1-chlorophenothiazine in 500 ml. of acrylonitrile and 1 ml. of a 40% solution of benzyltrimethylammonium hydroxide is heated on a steam bath for two hours. After cooling, the crystalline product, 10-(2'-cyanoethyl)-1-chlorophenothiazine, is filtered off and is recrystallized from acetone.

The cyano compound (10.0 g.) is hydrolyzed to the corresponding 10-(2'-carbomethoxyethyl) compound by reaction with hydrogen chloride (30 g.) in 150 ml. of dry methanol. Hydrolysis of this ester (3.0 g.) by refluxing in methanol with one equivalent of potassium hydroxide yields 10-(2'-carboxyethyl)-1-chlorophenothiazine. A solution of 6.0 g. of this acid in 250 ml. of dry benzene with 40 ml. of trifluoroacetic anhydride is heated at reflux for three hours. Washing with dilute sodium hydroxide and evaporating the solution yields 11-chloro - 2,3 - dihydro - 3 - keto - 1H - pyrido[3,2,1-kl] phenothiazine. This ketone (1.0 g.) is reacted with hydroxylamine hydrochloride (0.6 g.) by heating in 50 ml. of pyridine and the resulting oxime is reacted with sodium amalgam (20.0 g.) in 75 ml. of ethanol and 1.5 ml. of glacial acetic acid and isolated as in Example 1 to give 3 - amino - 1,2 - dihydro - 11 - chloro - 3H - pyrido[3,2,1-kl]phenothiazine hydrochloride.

A mixture of the hydrochloride in 500 ml. of water is made alkaline with 10% sodium hydroxide solution. The 3 - amino-1,2-dihydro-11-chloro-3H-pyrido[3,2,1-kl] phenothiazine is extracted with xylene.

The xylene extracts, 9.8 g. of butyl bis(β-chloroethyl) amine and 14.0 g. of potassium carbonate are heated at reflux for ten hours. The cooled reaction mixture is poured into water and the organic layer is separated. Upon evaporation of the solvent in vacuo, the product, 3 - (4' - butyl - 1' - piperazinyl) - 1,2 - dihydro - 11-chloro-3H-pyrido[3,2,1-kl]-phenothiazine is obtained.

A solution of 1.0 g. of the free base in 100 ml. of ether is treated with an excess of alcoholic hydrogen chloride solution to separate the crystalline dihydrochloride.

*Example 15*

A mixture of 13.6 g. of 3-amino-1,2-dihydro-11-chloro-3H-pyrido[3,2,1-kl]phenothiazine hydrochloride, prepared as in Example 14, in 500 ml. of water is made alkaline with 10% sodium hydroxide solution, the acid with formic acid solution. Aqueous formaldehyde (90 ml.) is added and the resulting mixture heated on the steam bath for two hours. The filtered mixture is made alkaline with 10% sodium hydroxide solution. Extraction with benzene and concentration of the solution yields 1,2-dihydro-3-dimethylamino-11-chloro-3H-pyrido[3,2,1-kl]phenothiazine.

An ether solution of 1.0 g. of the free base is treated with an excess of alcoholic hydrogen chloride to separate the crystalline monohydrochloride.

*Example 16*

A mixture of 13.3 g. of 3-trifluoromethylphenothiazine, 3.0 g. of acrylonitrile and 0.5 g. of tributylamine in 400 ml. of ether is heated on a steam bath for four hours. Evaporation of the solvent and recrystallization of the residue from acetone yields the crystalline product, 10-(2'-cyanoethyl)-3-trifluoromethylphenothiazine.

A solution of 8.0 g. of the cyano compound in 300 ml. of dioxane is heated on the steam bath with an aqueous methanol solution of sodium hydroxide for two hours. The solution is concentrated to give a residue which is washed with water and with dilute hydrochloric acid.

The residue is then taken up with benzene. The benzene solution is extracted with dilute sodium hydroxide and the extracts neutralized to yield crystals of 10-(2'-carboxyethyl)-3-trifluoromethylphenothiazine.

A solution of 6.7 g. of this acid in 250 ml. of dry ether with 2.0 g. of phosphorous pentoxide is heated at reflux for four hours. The solution is concentrated to yield the crude product, 2,3-dihydro-3-keto-9-trifluoromethyl-1H-pyrido[3,2,1kl]phenothiazine.

A solution of 4.8 g. of the ketone and 2.8 g. of hydroxylamine hydrochloride in 80 ml. of pyridine is heated at reflux for two hours. The solution is concentrated and the residue taken up in benzene. Evaporation of the solvent and cooling gives the yellow crystals of the oxime.

The oxime (1.6 g.) is dissolved in 100 ml. of ethanol; the resulting solution is stirred while 23.7 g. of sodium amalgam and 1.5 ml. of glacial acetic acid are added portionwise. After the reaction mixture is stirred for about one hour, a mixture of 150 ml. of water and 100 ml. of ether is added. The resulting mixture is treated with dilute hydrochloric acid to form 3-amino-1,2-dihydro-9-trifluoromethyl- 3H - pyrido [3,2,1kl] phenothiazine hydrochloride as crystals from ethanol-ether.

A mixture of 17.4 g. of the hydrochloride in 400 ml. of water is made alkaline with 10% sodium hydroxide solution. The free amine is extracted with xylene.

The xylene extracts together with 12.3 g. of propyl bromide and 12.0 g. of sodium bicarbonate are heated at reflux for eight hours. The cooled reaction mixture is poured into water and the organic layer is separated. Evaporation of the solvent in vacuo yields the crude product, 1,2-dihydro-3-dipropylamino-9-trifluoromethyl-3H-pyrido[3,2,1-kl]phenothiazine which is purified by molecular distillation at 200° C. and 10 microns.

The product (1.0 g.) is dissolved in 150 ml. of ether and treated with an excess of alcoholic hydrogen chloride to separate the crystalline monohydrochloride.

*Example 17*

A mixture of 17.4 g. of 3-amino-1,2-dihydro-9-trifluoromethyl-3H-pyrido[3,2,1kl]phenothiazine hydochloride (prepared as in Example 16) in 500 ml. of water is made alkaline with 10% sodium hydroxide solution, then acid with formic acid solution. Aqueous 37% formaldehyde (90 ml.) is added and the resulting mixture is heated on the steam bath for two hours. The filtered mixture is made alkaline with 10% sodium hydroxide solution. Extraction with benzene and evaporation of the solvent in vacuo yields 1,2-dihydro-3-dimethylamino-9-trifluoromethyl-3H-pyrido[3,2,1-kl]phenothiazine which is purified by molecular distillation.

*Example 18*

4-trifluoromethylphenothiazine (13.0 g.) is reacted with an excess of acrylonitrile (500 ml.) under basic conditions as in Example 14 to produce 10-(2'-cyanoethyl)-4-trifluoromethylphenothiazine.

The cyano compound (16.0 g.) is hydrolyzed to the corresponding 10-(2'-carbomethoxyethyl) compound by reaction with hydrogen chloride (31.0 g.) in 150 ml. of dry methanol. The ester is isolated and 1.0 g. is hydrolyzed by refluxing in 50 ml. of methanol with one equivalent of potassium hydroxide to yield 10-(2'-carboxyethyl)-4-trifluoromethylphenothiazine. A solution of 7.5 g. of this acid in 300 ml. of dry benzene with 40 ml. of trifluoroacetic anhydride is heated at reflux for three hours. The volatiles are evaporated and the product isolated as in Example 1 to give the 2,3-dihydro-3-keto-8-trifluoromethyl-1H-pyrido[3,2,1-kl]phenothiazine. The ketone (2.5 g.) is reacted with hydroxylamine hydrochloride (1.38 g.) by heating at reflux in 100 ml. of pyridine. The resulting oxime is reacted with 23.7 g. of sodium amalgam and 1.5 ml. of glacial acetic acid in 75 ml. of ethanol with isolation as in Example 1 to give 3-amino-1,2-dihydro-8-trifluoromethyl-3H-pyrido[3,2,1kl]phenothiazine hydrochloride.

A slurry of 17.4 g. of the primary amine hydrochloride in 500 ml. of water is made alkaline with 10% sodium hydroxide solution, then acid with formic acid solution. Aqueous 37% formaldehyde (90 ml.) is added and the resulting mixture heated on the steam bath for two hours. The filtered mixture is made alkaline with 10% sodium hydroxide solution. Extraction with benzene and concentration of the solvent yields the product, 1,2-dihydro-3-dimethylamino-8-trifluoromethyl-3H-pyrido[3,2,-1-kl]phenothiazine which is purified by molecular distillation at 180° C. and 10 microns.

A solution of 1.0 g. of the free base in ethyl acetate is added to a solution of mandelic acid in ethanol. Concentration of the resulting solution and cooling yields the crystalline 1,2-dihydro-3-dimethylamino-8-trifluoromethyl-3H-pyrido[3,2,1-kl]phenothiazine mandelate.

*Example 19*

2-Methylphenothiazine (10.6 g.) is reacted with an excess of acrylonitrile (500 ml.) under basic conditions and isolated as in Example 14 to produce 10-(2'-cyanoethyl)-2-methylphenothiazine.

The cyano compound (5.0 g.) is hydrolyzed to the corresponding 10-(2'-carbomethoxyethyl) compound by reaction with 15 g. of hydrogen chloride in 100 ml. of dry methanol. Hydrolysis of this ester (1.0 g.) by refluxing in methanol with one equivalent of potassium hydroxide yields 10-(2'-carboxyethyl)-2-methylphenothiazine. A solution of 6.0 g. of this acid in 250 ml. of dry benzene with 40 ml. of trifluoroacetic anhydride is heated at reflux for three hours. Washing with dilute sodium hydroxide and evaporating the solution yields 2,3-dihydro-3-keto-4-methyl-1H-pyrido[3,2,1-kl]phenothiazine. This ketone (1.0 g.) is reacted with hydroxylamine hydrochloride (0.6 g.) to give the corresponding oxime which is then reacted with sodium amalgam (20.0 g.) and glacial acetic acid (1.5 ml.) and isolated as in Example 1 to give 3-amino-1,2-dihydro-4-methyl-3H-pyrido[3,2,1kl]phenothiazine hydrochloride.

A mixture of 15.2 g. of the hydrochloride in 300 ml. of water is made alkaline with 10% aqueous sodium hydroxide solution. The free amine is extracted with benzene.

The benzene extracts together with 12.3 g. of hexyl bis(β-chloroethyl)amine and 14.0 g. of potassium carbonate are heated at reflux for eight hours. The cooled reaction mixture is treated with water and the benzene layer is separated. Upon evaporation of the solvent in vacuo the product, 1,2-dihydro-3-(4'-hexyl-1'-piperazinyl)-4-methyl-3H-pyrido[3,2,1kl]phenothiazine is obtained.

*Example 20*

A mixture of 15.2 g. of 3-amino-1,2-dihydro-4-methyl-3H-pyrido[3,2,1-kl]phenothiazine hydrochloride (prepared as in Example 19) in 300 ml. of water is made alkaline with 10% potassium hydroxide solution, then acid with formic acid solution. Aqueous 37% formaldehyde (90 ml.) is added and the resulting mixture is heated on the steam bath for two hours. The filtered mixture is made alkaline with 10% potassium hydroxide solution. Extraction with benzene and concentration of the solvent yields the product: 1,2-dihydro-3-dimethylamino-4-methyl-3H-pyrido[3,2,1-kl]-phenothiazine which is purified by molecular distillation at 180° C. and 10 microns.

The base (1.0 g.) is dissolved in 200 ml. of ether and treated with an excess of hydrogen chloride to separate the crystalline hydrochloride.

*Example 21*

3-methylphenothiazine (10.6 g.) is reacted with an excess of acrylonitrile (500 ml.) with 1 ml. of benzyltrimethylammonium hydroxide solution and isolated as in Example 14 to produce 10-(2'-cyanoethyl)-3-methylphenothiazine.

The cyano compound (5.0 g.) is hydrolyzed to the corresponding 10-(2'-carbomethoxyethyl) compound by reaction with 15 g. of hydrogen chloride in 100 ml. of dry methanol. Hydrolysis of this ester (1.0 g.) by refluxing in methanol with one equivalent of potassium hydroxide yields 10-(2'-carboxyethyl)-3-methylphenothiazine. A solution of 6.0 g. of this acid in 250 ml. of dry benzene is heated at reflux for three hours with 40 ml. of trifluoroacetic anhydride. Washing with dilute sodium hydroxide and evaporating the solution yields 2,3-dihydro-3-keto-5-methyl-1H-pyrido[3,2,1-kl]phenothiazine. This ketone (1.0 g.) is reacted with 0.6 g. of hydroxylamine hydrochloride to give the corresponding oxime which is then reacted with 20.0 g. of sodium amalgam and 1.5 ml. of glacial acetic acid in 100 ml. of ethanol and isolated as in Example 1 to give 3-amino-1,2-dihydro-5-methyl-3H-pyrido[3,2,1-kl]phenothiazine hydrochloride.

A mixture of 15.2 g. of the hydrochloride in 500 ml. of water is made alkaline with 10% aqueous sodium hydroxide solution. The free base is extracted with xylene.

The xylene extracts together with 13.7 g. of n-butyl bromide and 14.0 g. of potassium carbonate are heated at reflux for ten hours. The cooled reaction mixture is poured into water and the xylene layer is separated. Evaporation of the solvent in vacuo yields the product, 3-dibutylamino-1,2-dihydro-5-methyl-3H-pyrido[3,2,1-kl]phenothiazine which is purified by molecular distillation at 200° C. and 10 microns.

A solution of 1.0 g. of this base in 100 ml. of ethyl acetate is reacted with an excess of maleic acid to give the maleate salt.

*Example 22*

A mixture of 15.2 g. of 3-amino-1,2-dihydro-5-methyl-3H-pyrido[3,2,1-kl]phenothiazine hydrochloride (prepared as in Example 21) in 500 ml. of water is made alkaline with 10% sodium carbonate solution, then acid with formic acid solution. Aqueous 37% formaldehyde (90 ml.) is added and the resulting mixture heated on the steam bath for two hours. The filtered mixture is made alkaline with 10% sodium carbonate solution. Extraction with benzene and evaporation of the solvent in vacuo yields 1,2-dihydro-3-dimethylamino-5-methyl-3H-pyrido[3,2,1-kl]phenothiazine which is purified by molecular distillation at 190° and 10 microns.

The free base (2.0 g.) is dissolved in 250 ml. of ether and treated with an excess of alcoholic hydrogen chloride to separate the crystalline hydrochloride.

*Example 23*

10-(2'-cyanoethyl)-2-methoxyphenothiazine, prepared by reacting 2-methoxyphenothiazine (11.5 g.) with an excess of acrylonitrile (500 ml.) under basic conditions followed by the isolation procedure described in Example 14, is subjected to the following series of reactions with isolation procedures similar to those in Example 1 to produce 3-amino-1,2-dihydro-4-methoxy-3H-pyrido[3,2,1-kl]phenothiazine hydrochloride.

The cyano compound (5.0 g.) is hydrolyzed with 15.0 g. of hydrogen chloride in 100 ml. of dry methanol to give the corresponding 10-(2'-carbomethoxyethyl) compound. Hydrolysis of this ester (1.0 g.) by refluxing in 50 ml. of methanol with one equivalent of potassium hydroxide yields 10-(2'-carboxyethyl)-2-methoxyphenothiazine. A solution of 6.0 g. of this acid in 250 ml. of dry benzene is heated at reflux for three hours with 40 ml.

of trifluoroacetic anhydride. Washing with dilute sodium hydroxide and evaporating the solution yields 2,3-dihydro - 3-keto-4-methoxy-1H-pyrido[3,2,1-kl]phenothiazine. This ketone (1.5 g.) is reacted with (1.0 g.) of hydroxylamine hydrochloride by heating in 50 ml. of pyridine to give the corresponding oxime which is then reacted with sodium amalgam (20.0 g.) and glacial acetic acid (1.5 ml.) in ethanol solution as in Example 1 to give 3 - amino - 1,2-dihydro-4-methoxy-3H-pyrido[3,2,1-kl]-phenothiazine hydrochloride.

A mixture of the hydrochloride (16.0 g.) in 300 ml. of water is made alkaline with 10% sodium hydroxide solution. The free amine is extracted with benzene.

The benzene extracts together with 7.8 g. of methyl bis($\beta$-chloroethyl)amine and 12.0 g. of sodium carbonate are heated at reflux for 12 hours. After cooling, the reaction mixture is treated with water and the organic layer is separated. Evaporation of the solvent in vacuo yields the product, 1,2-dihydro-4-methoxy-3-(4'-methyl-1'-piperazinyl)-3H-pyrido[3,2,1-kl]phenothiazine.

A solution of 3.6 g. of the base in ethyl acetate is treated with excess citric acid. Concentration and cooling gives the dicitrate salt.

*Example 24*

3 - amino-1,2-dihydro-4-methoxy-3H-pyrido[3,2,1-kl]-phenothiazine hydrochloride (prepared as in Example 23) in 500 ml. of water is made alkaline with 10% sodium hydroxide solution, then acid with formic acid solution. Aqueous 37% formaldehyde (90 ml.) is added and the resulting mixture is heated on the steam bath for two hours. The filtered mixture is made alkaline with 10% sodium hydroxide solution. Extraction with benzene and evaporation of the solvent in vacuo yields the product, 1,2 - dihydro - 3 - dimethylamino-4-methoxy-3H-pyrido[3,2,1-kl]phenothiazine.

A solution of 1.0 g. of the free base in 100 ml. of ether is treated with an excess of alcoholic hydrogen chloride to produce the crystalline hydrochloride.

*Example 25*

3-methoxyphenothiazine (11.5 g.) is reacted with an excess of acrylonitrile (500 ml.) together with 1 ml. of quaternary base solution following the isolation procedure of Example 14 to produce 10-(2'-cyanoethyl)-3-methoxyphenothiazine which is then converted to 3-amino-1,2-dihydro-5-methoxy - 3H-pyrido[3,2,1-kl]phenothiazine hydrochloride using isolation and reaction conditions outlined in Example 1.

The cyano compound (12.0 g.) is hydrolyzed to the corresponding 10-(2'-carbomethoxyethyl) compound by reaction with 30.0 g. of hydrogen chloride in 150 ml. of dry methanol. Hydrolysis of this ester (6.0 g.) by refluxing in methanol with one equivalent of potassium hydroxide yields 10-(2'-carboxyethyl)-3-methoxyphenothiazine. A solution of 6.0 g. of this acid in 250 ml. of dry benzene is heated at reflux with 40 ml. of trifluoroacetic anhydride for three hours. Washing with dilute sodium hydroxide and evaporating the solution yields 2,3-dihydro-3-keto-5-methoxy - 1H - pyrido[3,2,1-kl]phenothiazine. The ketone (1.5 g.) is reacted with hydroxylamine hydrochloride (1.0 g.) to give the corresponding oxime which is reacted with sodium amalgam (20.0 g.) and glacial acetic acid (1.5 ml.) in alcoholic solution to give 3-amino-1,2-dihydro-5-methoxy-3H-pyrido[3,2,1-kl]-phenothiazine hydrochloride.

A mixture of the hydrochloride (16.0 g.) in 400 ml. of water is made alkaline with 10% aqueous sodium hydroxide solution. The free amine is extracted with xylene.

The xylene extracts together with 15.0 g. of n-hexyl bromide and 12.0 g. of potassium carbonate are heated at reflux for ten hours. The cooled reaction mixture is poured into water and the xylene layer separated. Upon evaporation of the solvent in vacuo, 3-dihexylamino-1,2-dihydro-5-methoxy - 3H - pyrido[3,2,1-kl]phenothiazine is obtained as a waxy material.

*Example 26*

A mixture of 16.0 g. of 3-amino-1,2-dihydro-5-methoxy - 3H - pyrido[3,2,1-kl]phenothiazine hydrochloride (prepared as in Example 25) in 400 ml. of water is made alkaline with 10% sodium hydroxide solution, then acid with formic acid solution. Aqueous 37% formaldehyde (90 ml.) is added and the resulting mixture heated on the steam bath for two hours. The filtered mixture is made alkaline with 10% sodium hydroxide solution. Extraction with xylene and evaporation of the solvent in vacuo yields 1,2-dihydro-3-dimethylamino-5-methoxy-3H-pyrido[3,2,1-kl]phenothiazine which is purified by molecular distillation at 190° and 10 microns.

A solution of the free base (1.0 g.) in 100 ml. of ether is reacted with an excess of alcoholic hydrogen bromide to yield the hydrobromide salt.

*Example 27*

2-methyl-8-trifluoromethylphenothiazine (14.0 g.) is reacted with an excess of acrylonitrile (500 ml.) under basic conditions and isolated as in Example 14 to produce 10-(2'-cyanoethyl)-2-methyl-8-trifluoromethylphenothiazine.

The cyano compound (16.5 g.) is hydrolyzed to the corresponding 10-(2'-carbomethoxyethyl) compound by reaction with a solution of 31.0 g. of hydrogen chloride in 150 ml. of dry methanol. Hydrolysis of this ester (6.0 g.) by refluxing in methanol with one equivalent of potassium hydroxide yields 10-(2'-carboxyethyl)-2-methyl-8-trifluoromethylphenothiazine. A solution of 7.5 g. of this acid in 300 ml. of dry benzene with 40 ml. of trifluoroacetic anhydride is heated at reflux for three hours. The solution is evaporated after washing with dilute sodium hydroxide to give 2,3-dihydro-3-keto-4-methyl-10-trifluoromethyl - 1H - pyrido[3,2,1-kl]phenothiazine. The ketone (2.5 g.) is reacted with hydroxylamine hydrochloride (1.3 g.) in boiling pyridine to give the corresponding oxime which is then reacted with 23.0 g. of sodium amalgam in acidic alcoholic solution followed by isolation as in Example 1 to give 3-amino-1,2-dihydro-4-methyl-10-trifluoromethyl - 3H-pyrido[3,2,1-kl]phenothiazine hydrochloride.

A mixture of 18.6 g. of the hydrochloride in 300 ml. of water is made alkaline with 10% sodium hydroxide solution, then acid with formic acid solution. Aqueous 37% formaldehyde (90 ml.) is added and the resulting mixture heated on the steam bath for two hours. The mixture is filtered and then made alkaline with 10% sodium hydroxide solution. Extraction with benzene and concentration of the solvent yields the product, 1,2-dihydro-3-dimethylamino-4-methyl-10-trifluoromethyl - 3H-pyrido[3,2,1-kl]phenothiazine.

The free base (2.0 g.) is dissolved in 200 ml. of ethyl acetate and treated with excess maleic acid to yield the maleate salt.

*Example 28*

10-(2'-cyanoethyl)-2-fluorophenothiazine is prepared by reacting 2-fluorophenothiazine (10.8 g.) with an excess of acrylonitrile (500 ml.) in the presence of a quaternary base (0.5 g.) as in Example 14.

The solid cyano compound (15.0 g.) is hydrolyzed to the corresponding 10-(2'-carbomethoxyethyl) compound by reaction with 31.0 g. of hydrogen chloride in 150 ml. of dry methanol. Hydrolysis of this ester (7.0 g.) by refluxing in methanol with one equivalent of potassium hydroxide yields 10-(2'-carboxyethyl)-2-fluorophenothiazine. A solution of 6.0 g. of this acid in 250 ml. of dry benzene is heated at reflux with 40 ml. of trifluoroacetic anhydride for three hours. Washing with dilute sodium hydroxide and evaporating the solution yields 2,3-dihydro-10-fluoro-3-keto - 1H-pyrido[3,2,1-kl]phenothiazine. The ketone (2.0 g.) is reacted, by heating at reflux in 25 ml. of pyridine, with hydroxylamine hydrochloride (1.2 g.) to give the corresponding oxime which is then reacted with 23.0 g. of sodium amalgam and 1.5 ml. of glacial acetic acid in 90 ml. of ethanol and isolated as in Example 1 to give 3-amino-1,2-dihydro-10-fluoro-3H-pyrido-[3,2,1-kl]phenothiazine hydrochloride.

A mixture of 13.6 g. of the hydrochloride in 300 ml. of water is made alkaline with 10% sodium hydroxide solution, then acid with formic acid solution. Aqueous 37% formaldehyde (90 ml.) is added and the resulting mixture heated on the steam bath for two hours. The filtered mixture is made alkaline with 10% sodium hydroxide solution. Extraction with benzene and evaporation of the solvent in vacuo yields 1,2-dihydro-3-dimethylamino-10-fluoro - 3H - pyrido[3,2,1-kl]phenothiazine.

The product (1.0 g.) is dissolved in ether and treated with an excess of alcoholic hydrogen chloride to separate the crystalline hydrochloride.

*Example 29*

2-bromophenothiazine (13.9 g.) is reacted with an excess of acrylonitrile (500 ml.) and 1.5 ml. of 40% benzyltrimethylammonium hydroxide solution as in Example 14 to produce 10-(2'-cyanoethyl)-2-bromophenothiazine which is then reacted as described in the following steps and isolated according to the methods of Example 1 to produce 3-amino-10-bromo-1,2-dihydro-3H-pyrido[3,2,1-kl]phenothiazine hydrochloride.

The cyano compound (10.0 g.) is hydrolyzed to the corresponding 10-(2'-carbomethoxyethyl) compound by reaction with 30.0 g. of hydrogen chloride in 150 ml. of dry methanol. Hydrolysis of this ester (7.0 g.) by refluxing in methanol with one equivalent of potassium hydroxide yields 2-bromo-10-(2'-carboxyethyl)-phenothiazine. A solution of this acid (6.0 g.) in 250 ml. of dry benzene is heated at reflux with 40 ml. of trifluoroacetic anhydride for three hours. Washing with dilute sodium hydroxide and evaporating the solution yields 10-bromo-2,3-dihydro-3-keto-1H-pyrido[3,2,1-kl]phenothiazine. The ketone (2.0 g.) is reacted with hydroxylamine hydrochloride (1.2 g.) to give the corresponding oxime which is then reacted with 23.0 g. of sodium amalgam and 1.5 ml. of glacial acetic acid in 75 ml. of ethanol and is isolated as in Example 1 to give 3-amino-10 - bromo - 1,2 - dihydro - 3H - pyrido[3,2,1 - kl] phenothiazine hydrochloride.

A mixture of 16.7 g. of the hydrochloride in 350 ml. of water is made alkaline with 10% sodium hydroxide solution, then acid with formic acid solution. Aqueous 37% formaldehyde (90 ml.) is added and the resulting mixture heated on the steam bath for two hours. The filtered mixture is made alkaline with 10% sodium hydroxide. Extraction with benzene and concentration of the solvent yields the product: 10-bromo-1,2-dihydro-3-dimethylamino-3H-pyrido[3,2,1-kl]phenothiazine.

The product (1.0 g.) is dissolved in ether and treated with an excess of alcoholic hydrogen chloride to separate the crystalline hydrochloride.

*Example 30*

10-(2'-cyanoethyl)-4-methylphenothiazine is prepared by reacting 4-methylphenothiazine (10.6 g.) with an excess of acrylonitrile (500 ml.) under basic conditions and isolated as in Example 14.

The cyano compound (5.0 g.) is hydrolyzed to the corresponding 10-(2'-carbomethoxyethyl) compound by reaction with 15.0 g. of hydrogen chloride in 100 ml. of dry methanol. Hydrolysis of this ester (1.0 g.) by refluxing in methanol with one equivalent of potassium hydroxide yields 10-(2'-carboxyethyl)-4-methylphenothiazine. A solution of 6.0 g. of this acid in 250 ml. of dry benzene is heated at reflux for three hours with 40 ml. of trifluoroacetic anhydride. Washing with dilute sodium hydroxide and evaporating the solution yields 2,3-dihydro-3-keto-6-methyl-1H-pyrido[3,2,1-kl]phenothiazine. This ketone (1.0 g.) is reacted in refluxing pyridine with hydroxylamine hydrochloride (0.6 g.) to give the corresponding oxime. The oxime (1.2 g.) is reduced with 20.0 g. of sodium amalgam in 100 ml. of acidic ethanol and isolated as in Example 1 to give 3-amino-1,2-dihydro-5-methyl-3H-pyrido[3,2,1-kl]phenothiazine hydrochloride.

A mixture of 15.2 g. of the primary amine hydrochloride in 300 ml. of water is made alkaline with 10% sodium hydroxide solution, then acid with formic acid solution. Aqueous 37% formaldehyde (90 ml.) is added and the resulting mixture heated on the steam bath for two hours. The filtered mixture is made alkaline with 10% sodium hydroxide solution. Extraction with xylene and evaporation of the solvent in vacuo yields 1,2-dihydro - 3 - dimethylamino - 6 - methyl - 3H - pyrido [3,2,1-kl]phenothiazine which is purified by molecular distillation at 200° C. and 10 microns.

A solution of 1.0 g. of the free base in 100 ml. of acetone is reacted with an excess of citric acid in acetone to form the citrate.

What is claimed is:

1. A chemical compound of the class consisting of a free base and its nontoxic, pharmaceutically acceptable, organic and inorganic, acid addition salts, the free base having the structural formula:

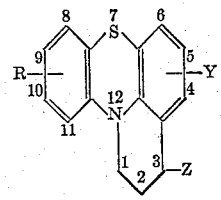

in which R is a member selected from the group consisting of hydrogen, chlorine, bromine, fluorine and trifluoromethyl; Y is a member selected from the group consisting of hydrogen, lower alkyl and lower alkoxy; and Z is a member of the group consisting of amino, lower alkylamino, di(lower alkyl)amino, pyrrolidinyl, piperidinyl, N-(lower alkyl)piperazinyl, morpholinyl and thiomorpholinyl.

2. A chemical compound having the fundamental structural formula:

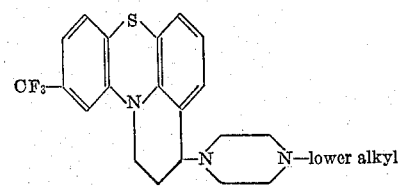

3. A chemical compound having the fundamental structural formula:

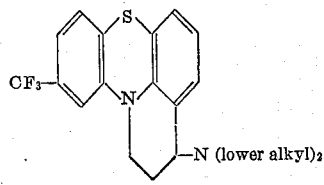

4. 3 - amino - 1,2 - dihydro - 3H - pyrido[3,2,1 - kl] phenothiazine.

5. 1,2 - dihydro - 3 - dimethylamino - 3H - pyrido [3,2,1-kl]phenothiazine.

6. 3 - amino - 1,2 - dihydro - 10 - trifluoromethyl - 3H-pyrido[3,2,1-kl]phenothiazine.

7. 1,2 - dihydro - 3 - dimethylamino - 10 - trifluoromethyl-3H-pyrido[3,2,1-kl]phenothiazine.

8. 10 - chloro - 1,2 - dihydro - 3 - dimethylamino - 3H-pyrido[3,2,1-kl]phenothiazine.

References Cited in the file of this patent

UNITED STATES PATENTS 2,830,050   Biel ------------------ Apr. 8, 1958

OTHER REFERENCES

Craig et al.: J. Org. Chem., vol. 22, pp. 709–711 (June 1957).

Mackie et al.: J. Chem. Soc., 1954, pp. 2577–9.

Smith: J. Org. Chem., vol. 15, pp. 1125–30 (1950).

Bykrit et al.: Ind. Eng. Chem., vol. 42, p. 1864 (1950).

Fujii: J. Pharm. Soc. Jap., vol. 77, No. 10, pp. 1068–1070 (October 1957).